United States Patent [19]

Oehlmann

[11] Patent Number: 5,235,172

[45] Date of Patent: Aug. 10, 1993

[54] METHOD OF READING A DATA CARRIER INCLUDING MULTIPLE ROWS OF BAR CODE

[76] Inventor: Harald Oehlmann, Kurt-Schumacher-Str. 22, D-6392 Neu-Anspach, Fed. Rep. of Germany

[21] Appl. No.: 950,751

[22] Filed: Sep. 24, 1992

Related U.S. Application Data

[63] Continuation of Ser. No. 540,832, Jun. 20, 1990, abandoned.

[30] Foreign Application Priority Data

Jun. 28, 1989 [DE] Fed. Rep. of Germany ....... 3921099

[51] Int. Cl.$^5$ .......................................... G06K 19/06
[52] U.S. Cl. ............................................. 235/494
[58] Field of Search ............... 235/448, 456, 494, 470, 235/462

[56] References Cited

U.S. PATENT DOCUMENTS

| | | | |
|---|---|---|---|
| 4,728,784 | 3/1988 | Stewart | 235/462 |
| 4,794,239 | 12/1988 | Allais | 235/462 |
| 4,853,920 | 8/1989 | Hosoya et al. | 235/456 |
| 4,910,725 | 3/1990 | Drexler et al. | 235/494 X |
| 4,912,311 | 3/1990 | Hasegawa et al. | 235/494 |
| 4,947,383 | 8/1990 | Hudson | 235/456 |
| 4,970,712 | 11/1990 | Tsuraoka et al. | 235/494 |
| 4,982,074 | 1/1991 | Ogasawara | 235/494 |
| 4,982,075 | 1/1991 | Aoki et al. | 235/456 |

FOREIGN PATENT DOCUMENTS 60-239879 11/1985 Japan ................... 235/494

OTHER PUBLICATIONS

Harmon et al, Reading Between the Lines pp. 22, 276–277, 68–69, 78–79 Jan. 3, 1989.

*Primary Examiner*—John Sheppard
*Assistant Examiner*—Edward H. Sikorski
*Attorney, Agent, or Firm*—Leydig, Voit & Mayer

[57] ABSTRACT

A data carrier has been described, wherein a bar code is arranged line by line in the data face of a data carrier. At the start and at the end of each line, an additional field is provided in which is arranged a line indicator. The line indicator equally exhibits a bar combination corresponding to the selected bar code. The additional fields of the first line contain the total number of the lines, with the total number being coded as a letter.

1 Claim, 2 Drawing Sheets

METHOD OF READING A DATA CARRIER INCLUDING MULTIPLE ROWS OF BAR CODE

This application is a continuation of application Ser. No. 07/540,832, filed Jun. 20, 1990 now abandoned.

BACKGROUND OF THE INVENTION

The present invention is concerned with a data carrier, the data face of which is furnished with parallel bars of different width and different spaces in the form of a bar code readable by optical data loggers (i.e., optical data detectors), with the data face, at least in part, being subdivided into rows or lines in which the bars are disposed in a direction vertical to the line axis. Equally, the invention is concerned with a method of reading a data carrier of the afore-described type.

One of the capabilities of coding information in machine-readable manner resides in that bars of different thickness be disposed at varying spaces in parallel to one another on a data carrier in accordance with a predetermined code. The bar code is broadly used with the European item number (EAN) for the clear cut identification of merchandise.

In that bar code printed, for example, on labels, the data face is provided with bars of the type whose length corresponds to an edge length of the rectangular data face. As the information is contained in the width of the bars and in the width of the spaces of the bars from one another, only one dimension of the data face is used for the data storage.

The afore-described data carriers involve the disadvantage that the information density is extremely low. In merchandise exhibiting sufficiently large faces for the provision of this data carrier, space requirements do not present a problem.

However, little space is available in high-quality microelectronical components of the type provided in integrated circuits and preferably containing individual identification characters. This applies, for example, to so-called EPROMS. Even the printed circuit board itself which in the course of the serial number allocation is furnished with bar codes in preparation for quality control, storage and quality warranty, avails of increasingly less space with rising information requirements.

Both jewel industry and jewel traders are attempting with the aid of ultra-high density coding which is difficult to read, to accommodate the information in an axis. Here, too, there is a need for accommodating a multiplicity of data in a relatively small face. Medical technology is encountering the problem of that, increasingly, an automatically readable description of medical drugs is being required, in respect of which the previously used data carriers furnished with bar codes are unsuitable in view of their substantial space requirements as medical drugs as such are always accommodated in small-sized packs.

Similarly, industry, increasingly, is required to provide tools or small-sized parts for employment in the most various fields of end-use application, with a corresponding code, permitting an automatic identification of substantial information content in minimum space.

The automobile industry has already been using tickets accommodating the whole of the information of up to 40 symbols in approximately six lines. However, no attention has been given to consistent space savings.

To solve the afore-described problems, Code 49 has been developed, which is a bar code disposed line by line in the data face. The lines are disposed one below the other, completely filling the rectangular data face. This bar code disposed line by line requires the lines to be read by the logger in the proper order of sequence. In case of manual systems, the operator will have to cause the system to scan the data carrier line by line.

However, when using an automatic reader in which the laser beam guided across the data carrier crisscrosses along a predetermined path such that the data carrier can be read in any desired position, the lines are not scanned in their proper order, with one or several lines also being read in the diagonal direction, resulting, in decoding, in a data mix having nothing in common with the actual information content of the data carrier.

To overcome this problem, according to Code 49, the symbols are combined to form words and, according to a predetermined code, are provided with a parity to thereby enable, in decoding, a line association by way of the parity pattern. In addition, at least one control symbol is needed containing, among others, the number of lines.

This type of arrangement of the bar code, concerning the evaluation thereof, is extremely complex, not offering the reliable readability required in the art. In diagonal reading, a parity combination can be logged portending a predetermined line number, in which case the information as read will not correspond to the information content of the corresponding line so that errors are likely to occur when employing conventional readers.

SUMMARY OF THE INVENTION

It is, therefore, the object of the invention to provide a data carrier in which the bar code is disposed line by line and which is readable by conventional loggers, with the reading reliability being notably improved compared to the state-of-the-art data carriers.

It has been shown that the reading can be markedly enhanced if each line is provided with a line indicator. For that purpose, at least on one end of each line, an additional face is provided in which the line indicator is located as a bar combination corresponding to the selected bar code.

Preferably, the total number of lines forming the bar combination corresponding to the selected bar code is provided in the additional face of the first line.

According to a preferred form of embodiment, the additional faces are provided at the two line ends.

In order to preclude confusion of the total number of symbols contained, in coded form, in the additional face of the first line, with the line indicator of the last line, the additional face of the first line is occupied by a bar combination readable by the logger as a letter symbol. As a total of up to 22 lines can be disposed one below the other, the line indicator Fl can adopt values from between 1 and 22. The following two Tables will convey the possible associations of the line indicators Fl to Fm.

| Indicator Line, Fl: | The following Table shows the combination between line number "m" and the symbol code in the first line Fl. |
|---|---|
| Symbol as Fl | Line number m |
| L | 1 |
| M | 2 |
| N | 3 |
| O | 4 |

-continued

| | |
|---|---|
| P | 5 |
| Q | 6 |
| R | 7 |
| S | 8 |
| T | 9 |
| U | 10 |
| V | 11 |
| W | 12 |
| X | 13 |
| Y | 14 |
| Z | 15 |
| - | 16 |
| . | 17 |
|   | 18 |
| $ | 19 |
| / | 20 |
| + | 21 |
| % | 22 |

Indicators of lines F2 to Fm; Table of line association for one-digit coding per line from F2 to Fm (up to F22 max.).

| Symbol from F2-Fm | is line No. |
|---|---|
| 0 | 2 |
| 1 | 3 |
| 2 | 4 |
| 3 | 5 |
| 4 | 6 |
| 5 | 7 |
| 6 | 8 |
| 7 | 9 |
| 8 | 10 |
| 9 | 11 |
| A | 12 |
| B | 13 |
| C | 14 |
| D | 15 |
| E | 16 |
| F | 17 |
| G | 18 |
| H | 19 |
| I | 20 |
| J | 21 |
| K | 22 |

Arranging the line indicators both at the beginning and at the end of the lines effectively precludes an incorrect diagonal reading as, in that case, the line indicator, at the start of the reading operation, is not in agreement with the line indicator at the end of the reading operation so that the information is rejected by the logger. In that case, the line indicators also assume the function of start/stop symbols.

However, in addition, one additional data field face each may be provided on both line ends adjacent the additional faces, provided with a start/stop symbol as a bar combination corresponding to the selected bar code. In that case, it would be adequate for attaining an optimum reading reliability, to provide one line indicator per line.

Preferably, the said data field faces are so arranged as to enable the bars forming the start and stop symbol, respectively, to extend at least across the total width of all lines.

The use of additional faces exhibiting line indicators enables the individual lines to be disposed in random arrangement on the data face of the data carrier. It is not absolutely required for the lines to be arranged one below the other.

The data carrier may, for example, be a label printed on which are the bars in black against a light background. Also, it will be possible for the data carrier to be made from deformable material, with the bars or intervals then being stamped or engraved in the form of grooves. Alternatively, the merchandise itself can be employed as the data carrier which offers itself, for example, in medical drugs, in the form of tablets as in view of the arrangement of the bar code in lines the space required is low.

The provision of additional fields including line indicators may be connected with additional safety checks. For example, a check digit calculation under the "modulo-43 method" of a specific weight may be provided to preclude overlaps by a forced shift per line field to the next one. Also, two independently shifted check sums of the standard-modulo-43 type may be provided.

The data carriers of the invention do not require any new readers but can rather be read by conventional loggers, with the light beam, in any desired order of sequence, being passed across the data face until all lines have been scanned. Subsequently, the lines are collated with the aid of the line indicators. The total number of lines contained in the additional face of the first line serves to make available to the reader the information required therefor. As in conventional loggers, the data carrier, relative to the reader, is not require be positioned in a predetermined direction, sos that some or several of the lines also are read diagonally. However, in decoding, this will not result in data full of errors as the analyzer recognizes with the aid of the different line indicators at the start and at the end of the respectively read data that such information will have to be rejected. The laser beam, in that case, will be continued to be passed across the data face, with the reader optionally indicating that the data carrier will have to be turned or displaced to some minor extent to enable all lines to be scanned.

Some examples of embodiment of the invention will be explained hereinafter with regard to the drawings in closer detail.

DETAILED DESCRIPTION OF THE PREFERRED EMBODIMENTS

Figure 1:
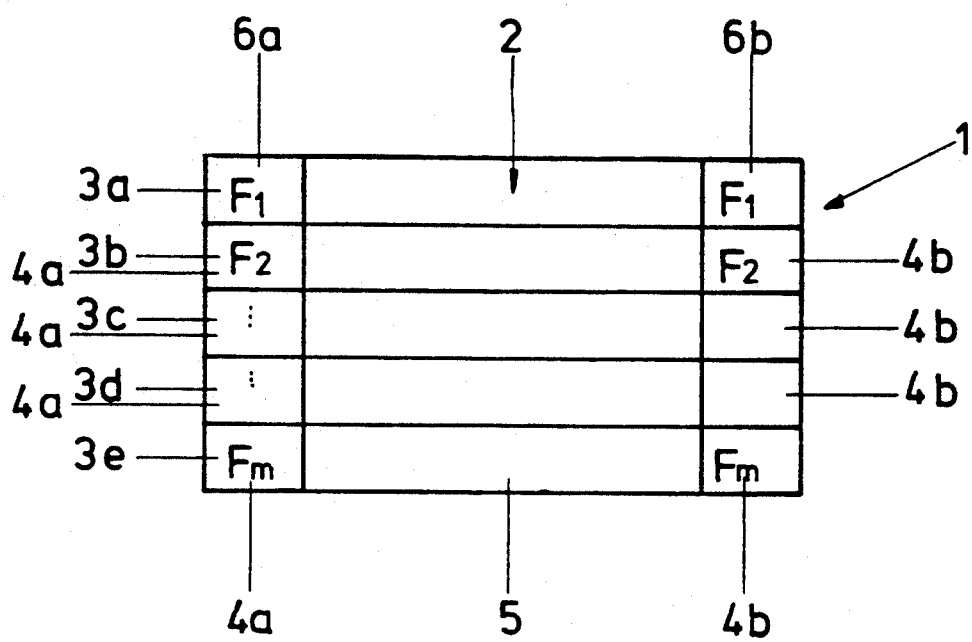
FIG. 1 schematically shows the plan view of a data carrier.

Now, referring to FIG. 1, a plan view of the data carrier 1 is schematically shown therein. The bars are not shown in this illustration. The whole of the data face 2 is subdivided into five rows or lines 3a to 3e. Each of the lines, in face 5, contains information and, at the start and at the end exhibits respectively one additional surface 4a, 4b, 6a and 6b in which are provided line indicators F1 to Fm. Each of the line indicators F is identically repeated at the line end.

The additional faces 6a and 6b of the first line 3a contain the total number of lines, with the selected bar combination showing a predetermined letter according to Table 1. In the 5-line example presently shown, the line indicator F1 contains a bar combination corresponding to letter P. This will distinguish the total number of lines contained, in coded form in F1, from the line indicator Fm in the fifth line 3e containing numeral 5. The reader and analyzer, hence, can differentiate between the total number of lines and the numeral in the last line. In the form of embodiment of FIG. 1 as shown, the line indicators Fl to Fm also assume the function of a stop/start symbol.

Figure 2:
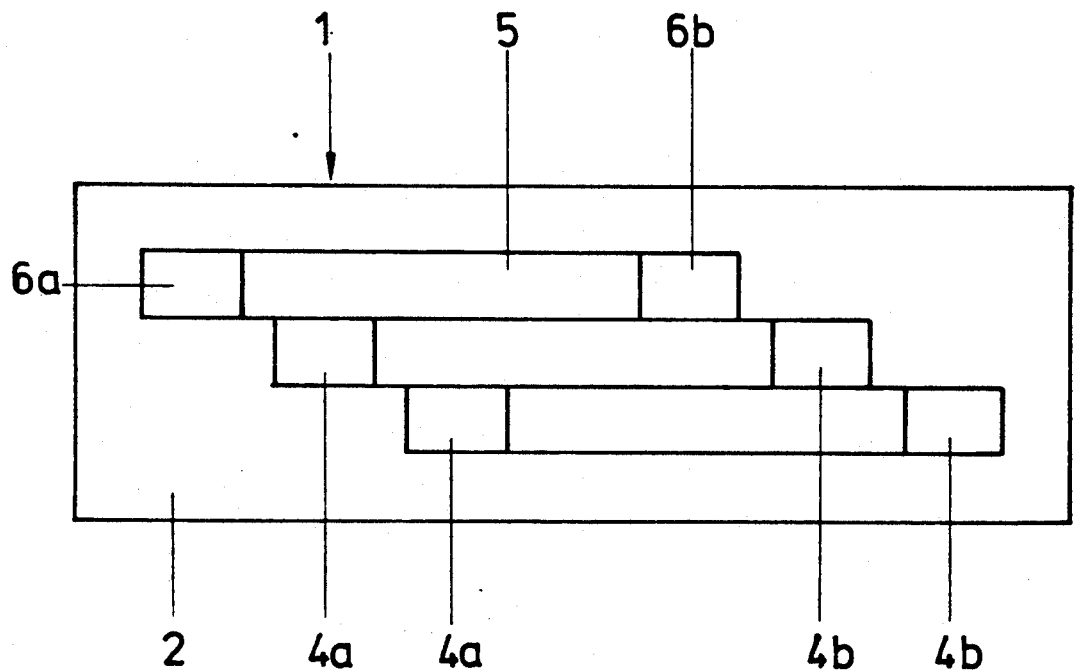
FIG. 2 shows a plan view of a data carrier according to another form of embodiment.

FIG. 2 shows another form of embodiment of the data carrier 1. The data face 2 exhibits lines 3a to 3c disposed in step-type manner. However, any other arrangement of lines within the data face of the data carrier 1 will be possible.

Figure 3:
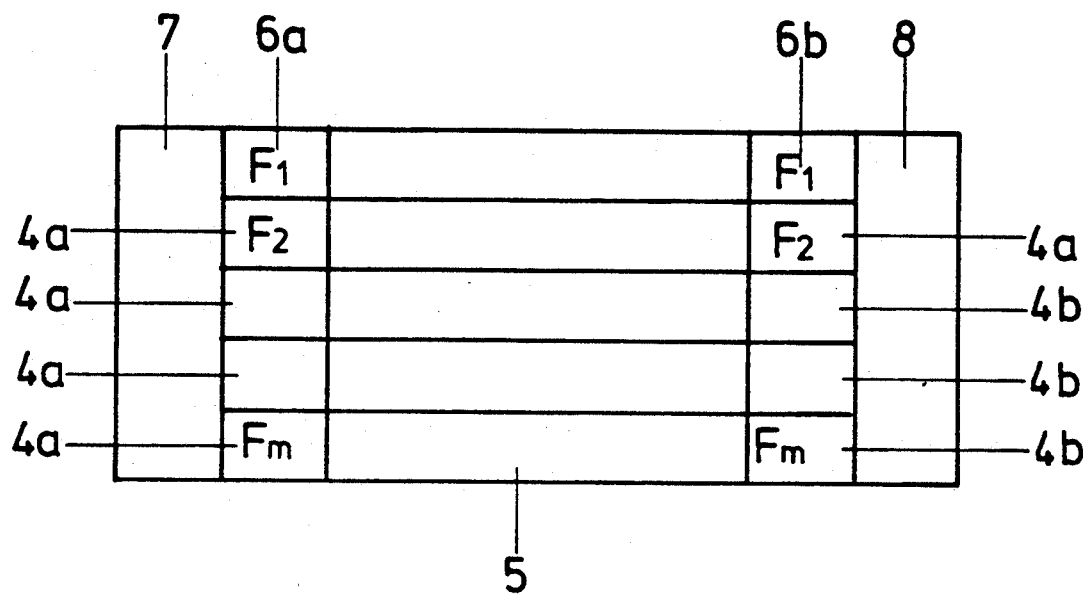
FIG. 3 shows the plan view of a data carrier according to another form of embodiment.
Figure 4:
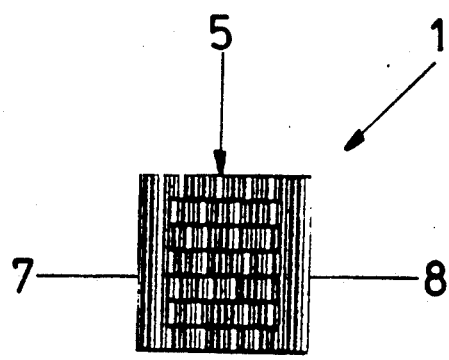
FIG. 4 shows the data carrier with bars drawn in according to the form of embodiment of FIG. 3.

According to FIG. 3, at the start and at the end of each line, additional data field faces 7 and 8 are provided containing the start and the stop symbol, respectively, as a bar combination. An example is shown in FIG. 4, wherein the bars representing the start and the stop symbol, respectively, in the data field faces 7 and 8, extend across the entire width of all lines. The additional fields for the line indicators are also contained in the embodiment according to FIG. 4, however, they can be identified only with the aid of the respective bar combination.

I claim:

1. A method of reading a data carrier having a main data face containing a plurality of rows of parallel bars of different thicknesses and varying spacing in the form of a selected bar code readable by an optical detector, said rows extending in one direction and said bars extending in a perpendicular direction, there being an additional data face at each end of each row, a row indicator disposed in each additional data face of each row of said plurality of rows except in a first row and including a bar combination corresponding to a character of a first character set of the selected bar code, and a coded symbol corresponding to a character of a second character set of the selected bar code disposed in the additional data face of the first row of said plurality of rows and indicative of the total number of rows in said group, the coded symbol being interpreted by the optical detector as a character of the second character set and the row indicators being interpreted by the optical detector as a character of the first character set, the characters of the first character set being different from the characters of the second character set, said method comprising guiding a light beam across the data carrier to scan the bar codes, decoding the scanned bar code into alpha-numerical characters, determining the total number of rows by decoding the coded symbol in the first row, stopping guiding of the light beam across the data carrier, after all rows, in accordance with the total number of rows indicated by the coded symbol of the first row and the row indicators, have been scanned, and thereafter collating the scanned bar codes of the rows by means of said row indicators.

* * * * *